_United States Patent Office_ 3,748,312
Patented July 24, 1973

3,748,312
THERMOSETTING HYDRAZIDE POLYMERS
Eugene A. Burns, Palos Verdes Peninsula, and Robert J. Jones, Hermosa Beach, Calif., assignors to TRW Inc., Redondo Beach, Calif.
No Drawing. Filed Apr. 3, 1972, Ser. No. 240,799
Int. Cl. C08g 20/00, 20/32, 20/38
U.S. Cl. 260—78.4 R     15 Claims

ABSTRACT OF THE DISCLOSURE

Resins having good thermal and chemical stability can be made by curing chemically stable alicyclic endo end capped aromatic prepolymers. The prepolymers can be made by reacting proper stoichiometric amounts of an aromatic or aliphatic polycarboxylic acid or derivative with a substituted or unsubstituted hydrazine compound, such as methylhydrazine, dimethylhydrazine, phenylhydrazine, or diphenylhydrazine, and end capping with an alicyclic endo compound having the formula:

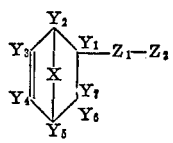

wherein $Y_1$–$Y_7$, inclusive, can be hydrogen, halogen, nitro, aryl, alkyl, alkyl ether, or alkaryl; X can be carbonyl, oxygen, sulfur, methylene, halogen substituted methylene, alkyl substituted methylene, or aryl substituted methylene; $Z_1$ can be an arylene radical or an alkylene group having 0 to 4 carbon atoms; and $Z_2$ can be an acid group, an acid halide, an amine, or an ester group. The end capping compounds are synthesized by reacting a cyclodiolefin with an olefinic compound according to a Diels-Alder reaction.

BACKGROUND OF THE INVENTION

The present invention relates to stable, high performance aliphatic or aromatic resins. Resins, according to this invention, are produced by a pyrolytic polymerization of prepolymers having reactive terminal groups. Pyrolytic polymerization is the coreaction of the reactive groups located at the terminal ends of the prepolymer upon heating at elevated temperature to cause chain extension and cross-linking of the prepolymer segment.

Polyimide resins have been produced by the pyrolytic polymerization reaction of a polyimide prepolymer having end caps of bicyclo(2.2.1)hept-5-ene-2,3-anhydride as disclosed in U.S. Pat. 3,528,950. The polyimide prepolymer was produced by reacting a diamine with a dianhydride and end capping the chain with a monoanhydride having the structure:

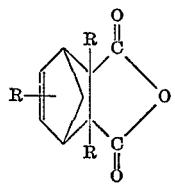

where R is hydrogen or an alkyl group.

Synthesis of compounds similar to the alicyclic endo compounds used herein have been disclosed by Diels and Alder in U.S. Pat. 1,944,731. These compounds are produced by reacting a diene with a dienophile to produce a six membered ring compound.

SUMMARY OF THE INVENTION

The high performance aliphatic or aromatic resins of this invention are produced by reacting hydrazine or substituted hydrazine with an aliphatic or aromatic polycarboxylic acid or derivative and end capping the polymer chain with a substituted alicyclic endo compound. The substituted hydrazine compound can contain aliphatic or aromatic substituents on the hydrazine, such as methyl, ethyl, or phenyl. The polymer chain which is produced by reacting proper stoichiometric amounts of the diacid and polyfunctional diamine is end capped with a substituent alicyclic endo compound having the formula:

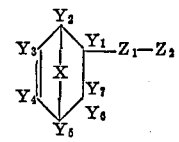

where $Y_1$–$Y_7$, inclusive, may be selected from hydrogen, halogen, nitro, aryl, alkyl having 1 to 6 carbon atoms, alkyl ether having 1 to 6 carbon atoms, or alkaryl; X may be selected from any of carbonyl, oxygen, sulfur, methylene, halogen substituted methylene, alkyl substituted methylene, or aryl substituted methylene; $Z_1$ is an arylene radical or an alkylene radical having 0 to 4 carbon atoms; $Z_2$ may be selected from any of:

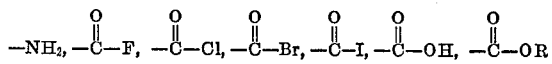

where R is a monovalent aliphatic or aromatic radical.
The end capping endo compound is produced by a Diels-Alder reaction wherein a cyclodiolefin having a formula:

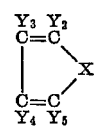

wherein $Y_2$–$Y_5$, inclusive, may be selected from any of hydrogen, halogen, nitro, aryl, alkyl having 1 to 6 carbon atoms, alkyl ether having 1 to 6 carbon atoms, alkaryl; and X may be selected from any of carbonyl, oxygen, sulfur, methylene, halogen substituted methylene, alkyl substituted methylene, and aryl substituted methylene is reacted with an olefinic compound having the formula:

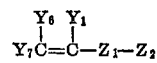

wherein $Y_1$, $Y_6$, and $Y_7$ may be selected from any of hydrogen, halogen, nitro, aryl, alkyl having 1 to 6 carbon atoms, alkyl ether having 1 to 6 carbon atoms, alkaryl; $Z_1$ is an alkylene radical having 0 to 4 carbon atoms; and $Z_2$ may be selected from any of:

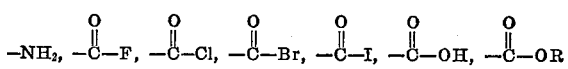

where R is a monovalent aliphatic or aromatic radical.
The prepolymers of this invention may be made by reacting a polycarboxylic acid with a dihydrazine compound and end capping the prepolymer with an alicyclic endo compound. The prepolymer which may be produced by the reaction of the diacid with a dihydrazine compound may be illustrated ideally as follows:

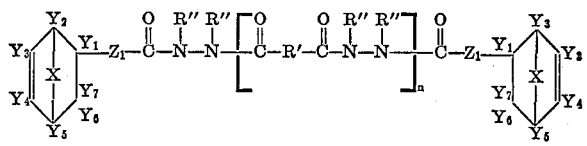

where R' is a divalent aliphatic or aromatic radical, R'' is hydrogen or a monovalent aliphatic or aromatic radical, X, Y, and Z have been defined above, and the n is an integer from 1 to 20. If a dehydrating agent is added to the prepolymer and R″ is hydrogen, then a polyoxadiazole is formed having the formula:

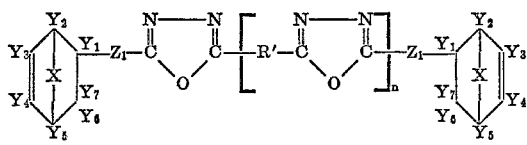

DISCLOSURE OF THE INVENTION

High performance resins can be made by curing prepolymers prepared by reacting stoichiometric amounts of an aliphatic or aromatic polycarboxylic acid with a substituted or unsubstituted hydrazine compound and end capping the prepolymer with an alicyclic endo compound. The prepolymers are characterized in that they are shelf-stable solids which react through the alicyclic endo compound to form a polymer having good properties in the temperature range of 280° C.–370° C. One of the chief advantages of these resins, in addition to their excellent physical, chemical, and thermal properties, is the ease with which articles may be fabricated from them. Thus, rather than fabricating articles from a liquid resin, fabricators may form the solid prepolymers of this invention from the liquid starting materials and fabricate the articles from a dry or slightly tacky prepolymer. The savings in cleanup time and materials is substantial without sacrifice of product properties.

Alicyclic endo end cap compounds are synthesized by reacting a cyclodiolefin having the formula:

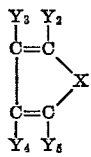

wherein $Y_2$–$Y_5$, inclusive, may be selected from any of hydrogen, halogen, nitro, aryl, alkyl having 1 to 6 carbon atoms, alkyl ether having 1 to 6 carbon atoms, or alkaryl; and X may be selected from any of carbonyl, oxygen, sulfur, methylene, halogen substituted methylene, alkyl substituted methylene, or aryl substituted methylene, with an olefinic compound having the formula:

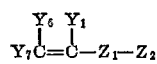

wherein $Y_6$, $Y_7$, and $Y_1$ are selected from the same groups represented by $Y_2$–$Y_5$; $Z_1$ is an arylene radical or an alkylene radical having 0 to 4 carbon atoms; and $Z_2$ may be selected from any of:

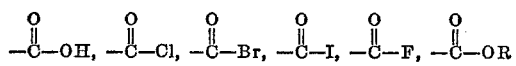

where R is a monovalent aliphatic or aromatic radical. Ideally, the reaction may be represented as follows:

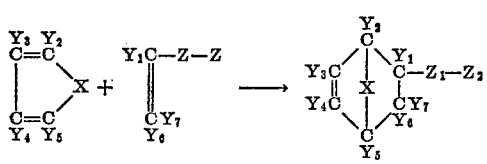

wherein $Y_1$–$Y_7$, X, $Z_1$, and $Z_2$ have been identified above.

The reaction is carried out in a liquid solvent, such as benzene, and temperatures of the reaction may range from room temperature to about 200° F.

The following table provides a list of a few of the representative cyclodiolefin compounds which are suitable for reaction to produce the alicyclic endo end cap compound.

TABLE I
furane
cyclopentadieneone
3,4-diphenylthiophene
cyclopentadiene
methylcyclopentadiene
1,1,2,3,4,5-hexachlorocyclopentadiene The following table provides a list of a few of the representative olefinic compounds which are suitable for reaction to produce the alicyclic endo end cap compound.

TABLE II
acrylic acid
2-methylacrylic acid
cinnamic acid
crotonic acid
2,3,3-trichloroacrylic acid One of the resins according to this invention may be produced by reacting stoichiometric amounts of hydrazine wtih an alicyclic endo mono acid or derivative, preferably an acid halide, at temperatures ranging from about 10° C. to about 200° C., and subsequently or simultaneously, the mixture is reacted with an aliphatic or aromatic diacid or derivative at temperatures ranging from about −18° C. to about 200° C. The simplest reaction where $n=1$ may be illustrated ideally as follows:

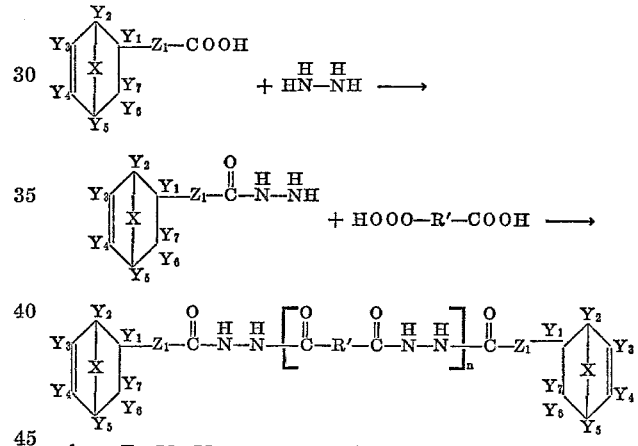

where $Z_1$, $Y_1$–$Y_7$, and X may have been previously identified, R′ is a divalent aliphatic or aromatic radical, and n is an integer from 1 to 20. The end cap compounds may be the same or different monovalent alicyclic endo mono acids or derivatives. As an alternative, up to about 50% of the alicyclic endo mono acid can be replaced by acrylic acid which, in effect, would produce a prepolymer having acrylic acid as one of the end capped groups.

Closure of the oxadiazole ring is effected by dehydrating in situ, i.e., simultaneously with the reaction of the constituents to yield a prepolymer having the formula:

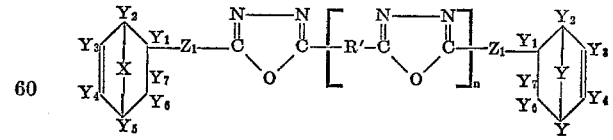

wherein R′, X, $Y_1$–$Y_7$, Z, and n have been defined above. The ring closure and prepolymer formation reactions must be carried out at temperatures below the polymer cure reaction temperature, i.e., below about 230° C. so as to avoid premature reaction of the prepolymer to form the final thermoset polymer.

Dehydrating agents used to facilitate the ring closure in the prepolymer reaction may be selected from organic anhydrides, such as acetic anhydride, and also, inert moisture absorbing agents such as molecular sieves. Organic dehydrating agents are preferred because of their ease of removal from the resin product of the dehydration reaction.

Although the prepolymers may be synthesized from any aliphatic or aromatic polycarboxylic acid or polycarboxylic acid derivative and hydrazine or substituted hydrazine compound, the compounds must be capable of reacting together and must remain stable at about 370° C. once they have reacted. For purposes of this invention, polycarboxylic means more than one carboxylic group on the molecule. Examples of several specific compounds are listed in the following tables.

Typical polycarboxylic acid or polycarboxylic acid derivatives which may be used in the practice of this invention are:

TABLE III
phthalic acid
isophthalic acid
terephthalic acid
bibenzoic acid
2,6-naphthalene dicarboxylic acid
malonic acid
succinic acid
glutaric acid
adipic acid
sebacic acid
malonic anhydride
succinic anhydride
sebacic anhydride
glutaric anhydride
adipic anhydride
dimethylphthalate
diphenylphthalate
3,6-endomethylene-1,2,3,6-tetrahydrophthalic anhydride
terephthaloyl chloride
isophthaloyl chloride It should be understood that esters and half esters of the acids and anhydrides listed in Table III will be equally suitable for use in the present invention. The ester and half ester substituents may be selected from aromatic, e.g. phenyl, or aliphatic, e.g. 1 to 4 carbon atoms, groups. As used in this context, the expression ester means that all carboxylic acid groups have aromatic or aliphatic substituent groups, while half ester means that only half of the carboxylic acid groups have aromatic or aliphatic substituent groups.

Typical hydrazine compounds which can be used in the practice of this invention are:

TABLE IV
hydrazine
methylhydrazine
1,2-dimethylhydrazine
ethylhydrazine
1,2-diethylhydrazine
phenylhydrazine
1,2-diphenylhydrazine Reaction of the prepolymer to form the polymeric product occurs through the alicyclic endo end capping compounds. While the exact mechanism of the polymeric reaction is not understood, it is postulated that a three-dimensional thermoset polymer is formed when the prepolymer is subjected to temperatures from approximately 230° C. to 370° C. for up to 4 hours. Although it is not necessary for cure, it has been discovered that the application of up to 700 atmospheres is beneficial in removing voids with the resultant improvements in product properties. The cure times, temperatures, and pressures are variables which depend on the composition, mass, and shape of the article being produced. For example, the cure for a large mass of neat resin may require a lower temperature applied for a longer period of time at a higher pressure in order to avoid cracking, incomplete consolidation, or voids, than a thin impregnated glass laminated article or a small article containing up to 80% by weight inert fillers, such as inorganic salts, metals, or other common filler materials.

While it is preferred that the terminal groups used on the prepolymers of this invention constitute only the alicyclic endo compounds, it has been found that up to about one half of the alicyclic endo compound can be replaced by an olefinic compound, such as acrylic acid without materially altering the properties of many of the polymers. Ideally, this provides a prepolymer with a acrylic radical end cap at one end of the prepolymer chain and an alicyclic endo end cap at the other.

In order to enhance product properties, crosslinking agents may be incorporated into the polymer chain. Solid or liquid organic compounds having olefinic unsaturation can be added to the initial starting material by reaction under pressure up to about 3000 p.s.i. Normally, an amount of crosslinking agent equivalent up to 10% by weight of resin at initiation of cure is used. Specific examples of a few of the gaseous olefinic compounds which are suitable crosslinking agents are ethylene, propylene, halogenated ethylene, halogenated propylene, and halogenated butadiene. Specific examples of liquid olefinic compounds which are suitable crosslinking agents are styrene, cyclopentadiene, furane, crotonic acid, acrylic acid, and halogenated, phenyl substituted, or methyl substituted forms thereof. Specific examples of a few of the solid olefinic compounds which are suitable crosslinking agents for purposes of this invention are tetraphenylcyclopentadiene, maleic acid and derivatives, cinnamic acid, and stilbene. In addition to the gaseous, liquid, or solid crosslinking agents, crosslinking sites may be built into the polymer chain by the use of polymer reactants having olefinic substituents; for example, a polyhydrazide made from maleic acid or stilbene dihydrazine. Furthermore, it should be readily apparent to those skilled in the art that various combinations of the above cross-linking agents may be used.

The following examples are illustrative of the procedure used to practice this invention.

EXAMPLE I

Approximately 2.4 grams of 3,4-diphenylthiophene are dissolved in 7 grams of benzene. Approximately 0.8 gram of acrylic acid are added to the solution and mixed thoroughly. The solution is warmed slightly and allowed to stand for 12 hours. Crystals of 3,4-diphenyl-2,5-endothiobenzoic acid precipitate from the solution.

EXAMPLE II

Approximately 3.0 grams of 3,4-diphenyl-2,5-endothiobenzoic acid prepared in Example I, approximately 0.6 gram of hydrazine, and approximately 2.0 grams of sebacic acid are thoroughly mixed in 300 ml. of acetone. The resulting mixture is stirred for 3 hours to give a solution of amide-acid prepolymer. The dimethylformamide varnish is stripped of solvent by evaporation on a rotary evaporator under vacuum at 140° C. for one-half hour. The resulting moist prepolymer is completely imidized by heating for 2 hours in a vacuum oven at 140° C. to give a dry powder. A ceramic dish containing the powder is placed in an oven at 350° C. for 30 minutes and then cooled to room temperature. A rigid, foam-like polymer is formed.

EXAMPLE III

Approximately 3.1 grams of 3,4-diphenyl-2,5-endothiobenzoic acid prepared in Example I, approximately 2.0 grams of terephthaloylchloride, and approximately 0.6 gram of hydrazine are thoroughly mixed in 300 ml. of dimethylformamide. Approximately 20 grams of acetic anhydride are added to the mixture. The mixture is processed in the same manner as set forth in Example II above. A rigid foamlike polymer is formed upon curing the precipitate.

We claim:
1. A method of making a prepolymer comprising reacting in the presence of an organic solvent proper stoichiometric amounts of

(A) a hydrazine compound characterized by the formula:

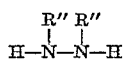

wherein R" is selected from hydrogen, alkyl, and aryl;
(B) an aliphatic or aromatic polycarboxylic compound selected from the group consisting of acids, anhydrides, esters, half esters, and halides, and
(C) an end cap compound comprising a substituted alicyclic endo compound having the formula:

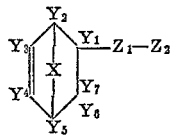

to give a prepolymer having 1 to 20 repeating units, wherein $Y_1$–$Y_7$, inclusive, is selected from the group consisting of hydrogen, halogen, nitro, aryl, alkyl having 1 to 6 carbon atoms, alkyl ether having 1 to 6 carbon atoms, and alkaryl; X is selected from the group consisting of carbonyl, sulfur, methylene, halogen substituted methylene, alkyl substituted methylene, and aryl substituted methylene; $Z_1$ is selected from the group consisting of an arylene radical and an alkylene radical having 0 to 4 carbon atoms; and $Z_2$ is selected from the group consisting of

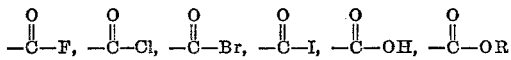

where R is a monovalent aliphatic or aromatic radical at temperatures ranging from —18° C. to 200° C.

2. A method of making a thermosetting prepolymer according to claim 1 wherein up to one-half of the end cap compound is replaced by acrylic acid.

3. A method of making a thermosetting prepolymer according to claim 1 wherein the substituted alicyclic endo compound is bicyclo(2.2.1)hept-5-ene-2-carboxylic acid.

4. A method according to claim 1 wherein the thermosetting prepolymer is subjected to chemical dehydration.

5. A method according to claim 1 wherein an olefinic crosslinking agent is added to the prepolymer reactants.

6. A method according to claim 1 wherein said carboxylic compound is a phenyl ester.

7. A method according to claim 1 wherein said carboxylic compound is a phenyl half ester.

8. A method according to claim 1 wherein said carboxylic compound is an aliphatic ester having 1 to 4 carbon atoms.

9. A method according to claim 1 wherein said carboxylic compound is an aliphatic half ester having 1 to 4 carbon atoms.

10. A thermosetting hydrazine polymer having the formula

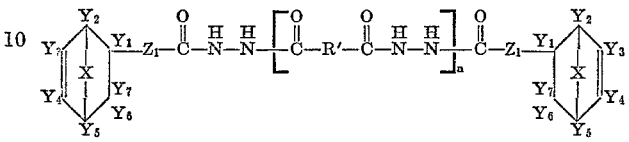

wherein R' is selected from the group consisting of bivalent aliphatic radical and bivalent aromatic radical; $Y_1$–$Y_7$, inclusive, is selected from the group consisting of hydrogen, halogen, nitro, aryl, alkyl having 1 to 6 carbon atoms, and alkaryl; X is selected from the group consisting of carbonyl, sulfur, methylene, halogen substituted methylene, alkyl substituted methylene, and aryl substituted methylene; $Z_1$ is selected from the group consisting of an arylene radical and an alkylene radical having 0 to 4 carbon atoms; and $n$ is an integer from 1 to 20.

11. A thermosetting prepolymer according to claim 10 wherein one of the end cap compounds is replaced by acrylic acid.

12. A thermosetting prepolymer according to claim 10 wherein an olefinic crosslinking agent is added.

13. A thermoset resin comprising the cured prepolymer of claim 10.

14. A thermoset resin comprising the cured prepolymer of claim 11.

15. A thermoset resin comprising the cured prepolymer of claim 12.

References Cited

UNITED STATES PATENTS

| | | | |
|---|---|---|---|
| 3,528,950 | 9/1970 | Lubowitz | 260—78.4 |
| 3,476,719 | 11/1969 | Frazer et al. | 260—78.4 |
| 1,944,731 | 10/1933 | Diels et al. | 260—346.6 |

JOSEPH L. SCHOFER, Primary Examiner

J. KIGHT III, Assistant Examiner

U.S. Cl. X.R.

260—47 CZ, CP, 78 R, TF, UA, SC, S, 78, 4D, 79